United States Patent
Inoue et al.

(10) Patent No.: US 8,688,130 B2
(45) Date of Patent: Apr. 1, 2014

(54) MOBILE STATION, BASE STATION, AND AREA SHAPING METHOD PERFORMED BY SPECIFIED BASE STATION

(75) Inventors: Yuki Inoue, Yokohama (JP); Keizo Cho, Yokohama (JP); Shinichi Mori, Yokohama (JP); Hiroyuki Hosono, Yokohama (JP); Akira Ishii, Yokosuka (JP); Kei Igarashi, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 0 days.

(21) Appl. No.: 13/618,233

(22) Filed: Sep. 14, 2012

(65) Prior Publication Data

US 2013/0012225 A1    Jan. 10, 2013

Related U.S. Application Data

(62) Division of application No. 12/596,910, filed as application No. PCT/JP2008/058113 on Apr. 25, 2008, now Pat. No. 8,301,152.

(30) Foreign Application Priority Data

Apr. 27, 2007  (JP) ................. 2007-120259

(51) Int. Cl.
*H04W 40/00*    (2009.01)

(52) U.S. Cl.
USPC ............. 455/446; 455/452.2; 455/456.1; 455/456.3; 455/456.5; 455/456.6; 455/514; 455/525; 455/67.11

(58) Field of Classification Search
USPC ............. 455/446, 452.2, 456.1, 456.3, 456.5, 455/456.6, 514, 524, 525, 67.11
See application file for complete search history.

(56) References Cited

U.S. PATENT DOCUMENTS

| | | | |
|---|---|---|---|
| 5,802,469 A * | 9/1998 | Nounin et al. | 455/422.1 |
| 6,915,139 B2 | 7/2005 | Hamabe | |
| 7,734,312 B2 | 6/2010 | Hosono et al. | |
| 2001/0036824 A1 * | 11/2001 | Hamabe | 455/422 |
| 2003/0064682 A1 * | 4/2003 | Iwamura | 455/13.4 |
| 2004/0082356 A1 * | 4/2004 | Walton et al. | 455/522 |

(Continued)

FOREIGN PATENT DOCUMENTS

| JP | 2001-313971 A | 11/2001 |
|---|---|---|
| JP | 2004-235827 A | 8/2004 |

OTHER PUBLICATIONS

Patent Abstracts of Japan, Publication No. 2001-313971, dated Nov. 9, 2001, 1 page.

(Continued)

*Primary Examiner* — Khai M Nguyen
(74) *Attorney, Agent, or Firm* — Osha Liang LLP

(57) ABSTRACT

A disclosed base station includes a communication unit configured to receive from a mobile station a first report signal including base station specification information specifying a base station, reception quality information indicating reception quality of a signal received from the specified base station, and change request information requesting to change communication quality between the mobile station and the specified base station; and an automatic area control unit configured to determine whether the base station is specified by the base station specification information, to obtain location information indicating the location of the mobile station if the base station is specified by the base station specification information, and to change at least one base station parameter based on the reception quality information and the location information to change the reception quality at the location of the mobile station.

3 Claims, 6 Drawing Sheets

(56) References Cited

U.S. PATENT DOCUMENTS

| | | | |
|---|---|---|---|
| 2005/0002422 A1* | 1/2005 | Morihiro et al. | 370/477 |
| 2006/0293008 A1* | 12/2006 | Hiraki et al. | 455/226.4 |
| 2007/0004416 A1* | 1/2007 | Nishimura et al. | 455/442 |
| 2007/0060192 A1* | 3/2007 | Morimoto et al. | 455/525 |
| 2011/0090812 A1 | 4/2011 | Aoyama | |

OTHER PUBLICATIONS

Patent Abstracts of Japan, Publication No. 2004-235827, dated Aug. 19, 2004, 1 page.

S. Mori, et al., B-5-8, 2005, IEICE, "Dynamic Common Pilot Channel Power Adaptation Algorithm for WCDMA Systems," p. 457, with translation, 7 pages.

3GPP TSG RAN #35, RP-070209, Lemesos, Cyprus, Mar. 6-9, 2007, "Requirements for LTE Home eNodeBs," 4 pages.

International Search Report issued in PCT/JP2008/058113, mailed on Jun. 10, 2008, with translation, 7 pages.

Written Opinion issued in PCT/JP2008/058113, mailed on Jun. 10, 2008, 3 pages.

* cited by examiner

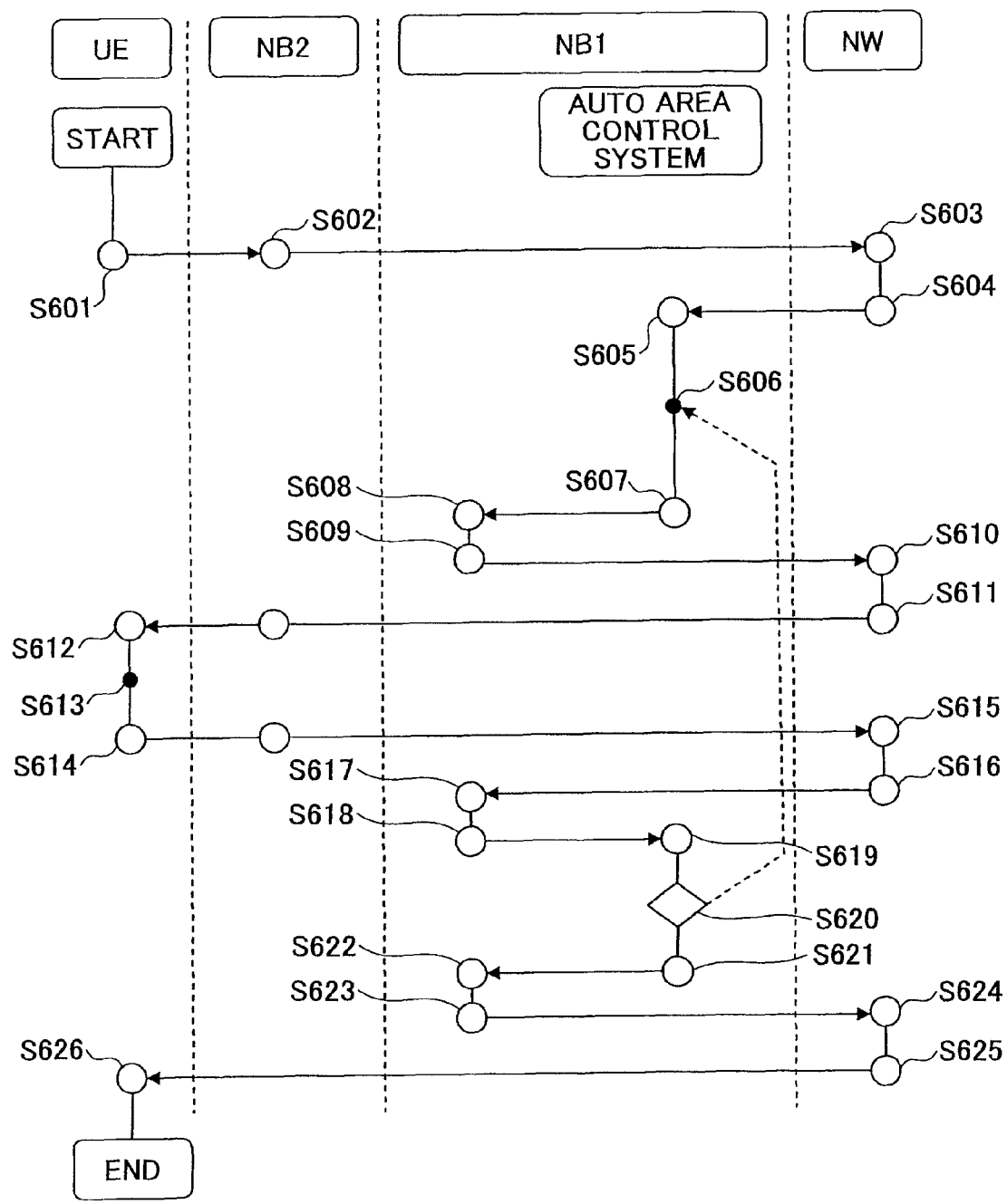

MOBILE STATION, BASE STATION, AND AREA SHAPING METHOD PERFORMED BY SPECIFIED BASE STATION

CROSS-REFERENCE TO RELATED APPLICATIONS

The present application is a divisional application of and, thereby, claims benefit under 35 U.S.C. §120 to U.S. application Ser. No. 12/596,910, entitled, "MOBILE STATION, BASE STATION, AND AREA SHAPING METHOD PERFORMED BY SPECIFIED BASE STATION," which is a national stage application of PCT Application No. PCT/JP2008/058113, filed on Apr. 25, 2008, which claims priority to JP 2007-120259 filed Apr. 27, 2007. The content of the priority application is incorporated by reference in its entirety.

TECHNICAL FIELD

The present invention generally relates to an area shaping method that makes it possible to change communication quality in mobile communications, and a mobile station and a base station for implementing the method. More particularly, the present invention relates to a method of autonomously shaping an area by a base station specified by a mobile station, and a mobile station and a base station suitable for the method.

BACKGROUND ART

In forming and managing a communication area in mobile communications, reception quality (propagation conditions) of radio signals from neighboring base stations at various points in the communication area is measured and base station parameters are configured or reconfigured based on the measured reception quality. Normally, such configuration and reconfiguration of parameters are manually performed by field engineers. For example, when a complaint is received from a mobile user, a field engineer conducts a field survey to measure propagation conditions of radio signals and configures or reconfigures base station parameters based on the measured propagation conditions.

Meanwhile, the number of base stations is being increased to improve communication quality in a wider area. When a base station is newly installed, it is necessary to reconfigure parameters of neighboring base stations in addition to configuring parameters of the newly-installed base station.

Meanwhile, private base stations for closed subscriber groups are expected to be widely used. Basically, a private base station does not require configuration and reconfiguration of parameters by a field engineer. Still, however, when a private base station is installed, it is necessary to reconfigure parameters of neighboring public base stations.

Under such circumstances, it is expected that the workload of configuring and reconfiguring base station parameters becomes high and it becomes difficult to configure and reconfigure base station parameters solely by hand. For this reason, automatic configuration and reconfiguration of base station parameters are proposed (see, for example, "Dynamic Common Pilot Channel Power Adaptation Algorithm for WCDMA Systems"; Mori Shinichi, Matsuki Hideo, Okajima Ichiro, Umeda Narumi; Proceedings of the IEICE General Conference, 2005, B-5-8).

DISCLOSURE OF INVENTION

Problems to be Solved by the Invention

Meanwhile, user's demands may include not only the improvement in communication quality but also reception of service via a specified private base station. This is partly because a private base station used by a limited number of users may provide better service than a public base station used by an unspecified number of users.

Related-art methods for automatically configuring and reconfiguring base station parameters can improve the communication quality in a region with poor communication quality. However, with the related-art methods, it is not possible to specify a base station and to cause the specified base station to autonomously include a specific region into the coverage area (service area) of the base station.

One object of the present invention is to solve or reduce one or more of the above problems and to provide an area shaping method that enables a base station specified by a mobile station to reshape its area and thereby to autonomously change communication quality without conducting a field survey, and a mobile station and a base station for implementing the method.

Means for Solving the Problems

According to a first aspect of the present invention, a method of shaping a communication area by a specified base station includes a signal receiving step of receiving from a mobile station a first signal including base station specification information specifying a base station, reception quality information indicating reception quality of a signal received from the specified base station, and change request information requesting to change communication quality between the mobile station and the specified base station; a base station determining step of determining whether a receiving base station receiving the first signal is specified by the base station specification information; a location identifying step of obtaining location information indicating the location of the mobile station if it is determined in the base station determining step that the receiving base station is specified by the base station specification information; and a parameter changing step of changing at least one base station parameter based on the reception quality information and the location information to change the reception quality at the location of the mobile station.

According to a second aspect of the present invention, the method of the first aspect further includes a pilot signal transmitting step of transmitting a pilot signal to the mobile station with the changed base station parameter; a change detecting step of receiving from the mobile station a second signal including measurement information obtained by the mobile station based on the pilot signal and detecting a change in the reception quality based on the measurement information; and a step of performing either a parameter storing step of storing the changed base station parameter if a desired change is detected in the change detecting step, or a repeating step of repeating the parameter changing step, the pilot signal transmitting step, and the change detecting step in the order mentioned if the desired change is not detected in the change detecting step.

According to a third aspect of the present invention, a method of shaping a communication area in mobile communications includes a signal receiving step, performed by a first base station, of receiving from a mobile station a first signal including base station specification information specifying a base station, reception quality information indicating reception quality of a signal received from the specified base station, and change request information requesting to change communication quality between the mobile station and the specified base station; a base station determining step, performed by the first base station receiving the first signal, of determining whether the first base station is specified by the base station specification information; a transfer step, performed by the first base station, of transferring the first signal to a second base station specified by the base station specification information if it is determined in the base station determining step that the first base station is not specified by the base station specification information; a location identifying step, performed by the second base station receiving the transferred first signal, of obtaining location information indicating the location of the mobile station; and a parameter changing step, performed by the second base station, of changing at least one base station parameter of the second base station based on the reception quality information and the location information to change the reception quality at the location of the mobile station.

According to a fourth aspect of the present invention, the method of the third aspect further includes a pilot signal transmitting step, performed by the second base station, of transmitting a pilot signal to the mobile station with the changed base station parameter; a change detecting step, performed by the second base station, of receiving from the mobile station a second signal including measurement information obtained by the mobile station based on the pilot signal and detecting a change in the reception quality based on the measurement information; and a step of performing by the second base station either a parameter storing step of storing the changed base station parameter if a desired change is detected in the change detecting step, or a repeating step of repeating the parameter changing step, the pilot signal transmitting step, and the change detecting step in the order mentioned if the desired change is not detected in the change detecting step.

According to a fifth aspect of the present invention, in the method of any one of the above aspects, the first signal further includes the location information indicating the location of the mobile station, and the location information is obtained from the first signal in the location identifying step.

According to a sixth aspect of the present invention, in the method of any one of the first through fourth aspects, the location information is obtained based on information regarding the mobile station obtained from a third base station that is able to communicate with the mobile station.

According to a seventh aspect of the present invention, in the method of any one of the above aspects, the at least one base station parameter includes at least one of a transmission power parameter, a transmission directivity parameter, a tilt angle parameter for a transmitting antenna, a frequency parameter, and a polarization condition parameter.

According to an eighth aspect of the present invention, in the method of the second or fourth aspect, a second signal transmission request signal requesting the mobile station to transmit the second signal is also transmitted in the pilot signal transmitting step.

According to a ninth aspect of the present invention, in the method of the second or fourth aspect, the pilot signal transmitted in the pilot signal transmitting step includes a second signal transmission request signal requesting the mobile station to transmit the second signal.

According to a tenth aspect of the present invention, in the method of the fourth aspect, a signal transmission request signal requesting the mobile station to transmit the second signal is transmitted via the first base station to the second base station.

According to an eleventh aspect of the present invention, in the method of any one of the above aspects, the change request information is either improvement request information requesting to improve the communication quality or reduction request information requesting to reduce the communication quality.

According to a twelfth aspect of the present invention, the method of the first or third aspect further includes, after the parameter changing step, a service providing step of providing communication service between the mobile station and the specified base station.

According to a thirteenth aspect of the present invention, the method of the second or fourth aspect further includes, after the parameter storing step, a service providing step of providing communication service between the mobile station and the specified base station.

According to a fourteenth aspect of the present invention, a mobile station includes a signal generating unit configured to generate a first signal including base station specification information specifying a base station, reception quality information indicating reception quality of a signal received from the specified base station, and change request information requesting to change communication quality between the mobile station and the specified base station; an interface configured to cause the signal generating unit to output the first signal in response to a user operation; and a communication unit configured to transmit the first signal output from the signal generating unit.

According to a fifteenth aspect of the present invention, the mobile station of the fourteenth aspect further includes a location information obtaining unit configured to obtain location information indicating the location of the mobile station.

According to a sixteenth aspect of the present invention, the mobile station of the fourteenth or fifteenth aspect further includes a reception quality measuring unit configured to generate the reception quality information by receiving a pilot signal transmitted from the base station specified by the base station specification information and measuring reception quality of the pilot signal.

According to a seventeenth aspect of the present invention, a base station includes a communication unit configured to receive from a mobile station a first signal including base station specification information specifying a base station, reception quality information indicating reception quality of a signal received from the specified base station, and change request information requesting to change communication quality between the mobile station and the specified base station; a base station determining unit configured to determine whether the base station is specified by the base station specification information; a location information obtaining unit configured to obtain location information indicating a location of the mobile station if it is determined by the base station determining unit that the base station is specified by the base station specification information; and a parameter changing unit configured to change at least one base station parameter based on the reception quality information and the location information to change the reception quality at the location of the mobile station.

According to an eighteenth aspect of the present invention, the base station of the seventeenth aspect further includes a pilot signal transmitting unit configured to transmit a pilot signal with the changed base station parameter; a change detecting unit configured to receive from the mobile station a second signal including measurement information obtained by the mobile station based on the pilot signal and to detect a change in the reception quality based on the measurement information; and a parameter storing unit configured to store the changed base station parameter if a desired change is detected by the change detecting unit.

Advantageous Effect of the Invention

An aspect of the present invention provides an area shaping method that enables a base station specified by a mobile station to reshape its area and thereby to autonomously change communication quality without conducting a field survey, and a mobile station and a base station for implementing the method.

BRIEF DESCRIPTION OF THE DRAWINGS

FIG. 6 is a sequence chart illustrating a quality improvement method according to another embodiment of the present invention.

EXPLANATION OF REFERENCES

Figure 1:
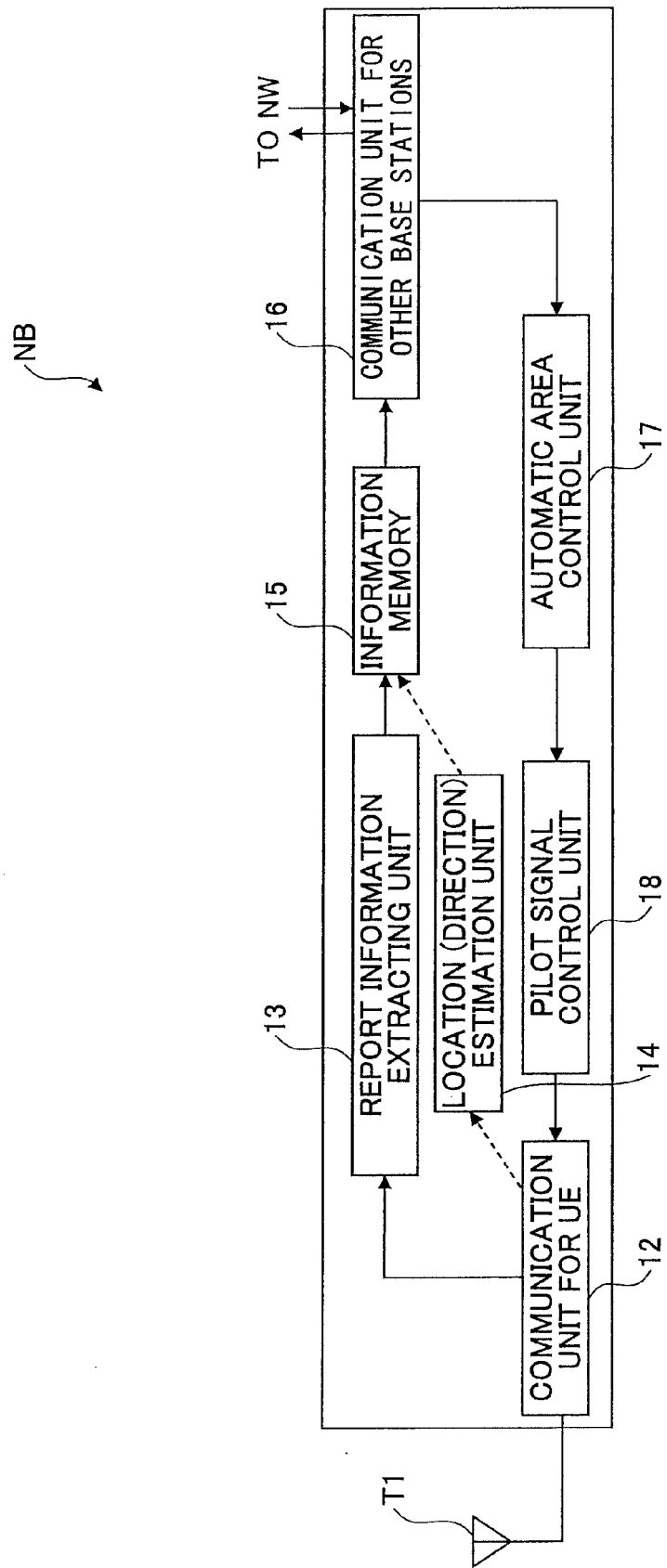
FIG. 1 is a block diagram illustrating a configuration of a base station according to an embodiment of the present invention.

12 Communication unit
13 Report information extracting unit
14 Location (direction) estimation unit
15 Information memory
16 Communication unit
17 Automatic area control unit
18 Pilot signal control unit
T1 Antenna
NB, NB1, NB2 Base station
21 User interface
22 Communication unit for communications with base stations
23 Report signal control unit
24 Location information obtaining unit
25 Information memory
26 Reception quality measuring unit
27 Information memory
T2 Antenna
UE User equipment

BEST MODE FOR CARRYING OUT THE INVENTION

Preferred embodiments of the present invention are described below with reference to the accompanying drawings. Throughout the accompanying drawings, the same or similar reference numbers are used for the same or similar components, and overlapping descriptions of those components are omitted.

First Embodiment (Base Station)

A configuration of a base station according to an embodiment of the present invention is described below with reference to FIG. 1. A base station NB (Node B) shown in FIG. 1 may be either a fixed base station for the general public or a private base station for a closed subscriber group. One type of private base station is called home eNodeB (see, for example, "Requirements for LTE Home eNodeBs", RP-070209, 3GPP TSG RAN #35, Lemesos Cyprus, Mar. 6-9, 2007). The home eNodeB may also be called a home NodeB, a femto cell, or an access point.

As shown in FIG. 1, the base station NB includes an antenna T1, a communication unit 12 for communications with mobile stations, a report information extracting unit 13, an information memory 15, a communication unit 16 for communications with other base stations, an automatic area control unit 17, and a pilot signal control unit 18.

The communication unit 12 transmits and receives radio signals via the antenna T1 to and from mobile stations.

The report information extracting unit 13 extracts information from a signal received by the communication unit 12. For example, when a mobile station transmits a report signal (first signal) including base-station specification information for specifying a base station, location information indicating the location of the mobile station (at least the direction of the mobile station seen from the base station), reception quality information indicating reception quality of a signal received from the specified base station, and improvement request information (may also be called coverage request information) for requesting improvement of communication quality between the mobile station and the base station, the communication unit 12 receives the report signal and the report information extracting unit 13 extracts the above information from the received report signal.

Meanwhile, when a mobile station transmits a measurement information signal (second signal) including measurement information indicating reception quality, the communication unit 12 receives the measurement information signal and the report information extracting unit 13 extracts the measurement information from the received measurement information signal.

Information extracted by the report information extracting unit 13 is, for example, stored in the information memory 15. The information memory 15 may also store base station ID information of the base station NB.

The communication unit 16, for example, transmits a signal including information stored in the information memory 15 to other base stations or an upper node and receives signals from other base stations or an upper node. The communication unit 16 may also send information stored in the information memory 15 to the automatic area control unit 17.

The automatic area control unit 17 changes a base station parameter(s) based on the base station specification information, the location information, the reception quality information, and the improvement request information sent from the communication unit 16 to change communication quality at the location of the mobile station. More specifically, the automatic area control unit 17 determines whether the base station NB is specified in the base station specification information.

If the base station NB is specified, the automatic area control unit 17 identifies the location of the mobile station based on the location information, determines reception quality at the location of the mobile station based on the reception quality information, and determines that it is necessary to improve the reception quality based on the improvement request information. Then, the automatic area control unit 17 determines a base station parameter to reshape the current coverage area such that the reshaped coverage area sufficiently encompasses the location of the mobile station. The automatic area control unit 17 may be configured to select a base station parameter from plural base station parameters that improves the reception quality at the location of the mobile station. A parameter for controlling transmission power of a radio signal transmitted from the base station and/or a parameter for controlling transmission directivity of the radio signal may be used as the base station parameter. Also, a parameter for controlling the tilt angle of the antenna T1 may be used as the base station parameter. Also, any other parameter, such as a parameter for changing the frequency or polarization conditions of a radio signal transmitted from the base station, may be used as the base station parameter as long as it can change the coverage area to encompass the location of the mobile station. Further, any combination of the above parameters may be used.

If the base station NB is not specified by the base station specification information, the automatic area control unit 17 may request the communication unit to transmit the base station specification information, the location information, the reception quality information, and the improvement request information stored in the information memory 15 to another base station or an upper node.

Meanwhile, when receiving the measurement information, the automatic area control unit 17 may determine whether a communication quality indicator (e.g., a reception level, a signal-to-noise ratio, etc.) in the measurement information is higher than a predetermined threshold. If the communication quality indicator is lower than or equal to the threshold, the automatic area control unit 17 may determine another base station parameter based on the measurement information to further improve the communication quality. If the communication quality indicator is higher than the threshold, the automatic area control unit 17 may report completion of reshaping the coverage area.

Alternatively, the automatic area control unit 17 may be configured to compare different base station parameters and thereby determine a base station parameter that better improves the reception quality at the location of the mobile station.

The pilot signal control unit 18 changes transmission power and/or directivity based on the base station parameter determined by the automatic area control unit 17 and then requests the communication unit 12 to transmit a pilot signal. With this configuration, since the pilot signal is transmitted with the changed parameter, it is possible to improve the communication quality between the base station and the mobile station (to some extent).

Referring again to FIG. 1, the base station NB includes a location (direction) estimation unit 14. The location (direction) estimation unit 14 estimates the location of the mobile station based on information obtained from other base stations (not shown) when the mobile station cannot obtain its location information via, for example, a global positioning system (GPS) and cannot include the location information in the report signal. In this case, location information indicating the estimated location is stored in the information memory 15 instead of the location information normally included in the report information and is used by the automatic area control unit 17.

(Mobile Station)

A configuration of a mobile station according to an embodiment of the present invention is described below with reference to FIG. 2. The mobile station may be any type of mobile terminal such as a cell phone and is hereafter called user equipment (UE).

Figure 2:
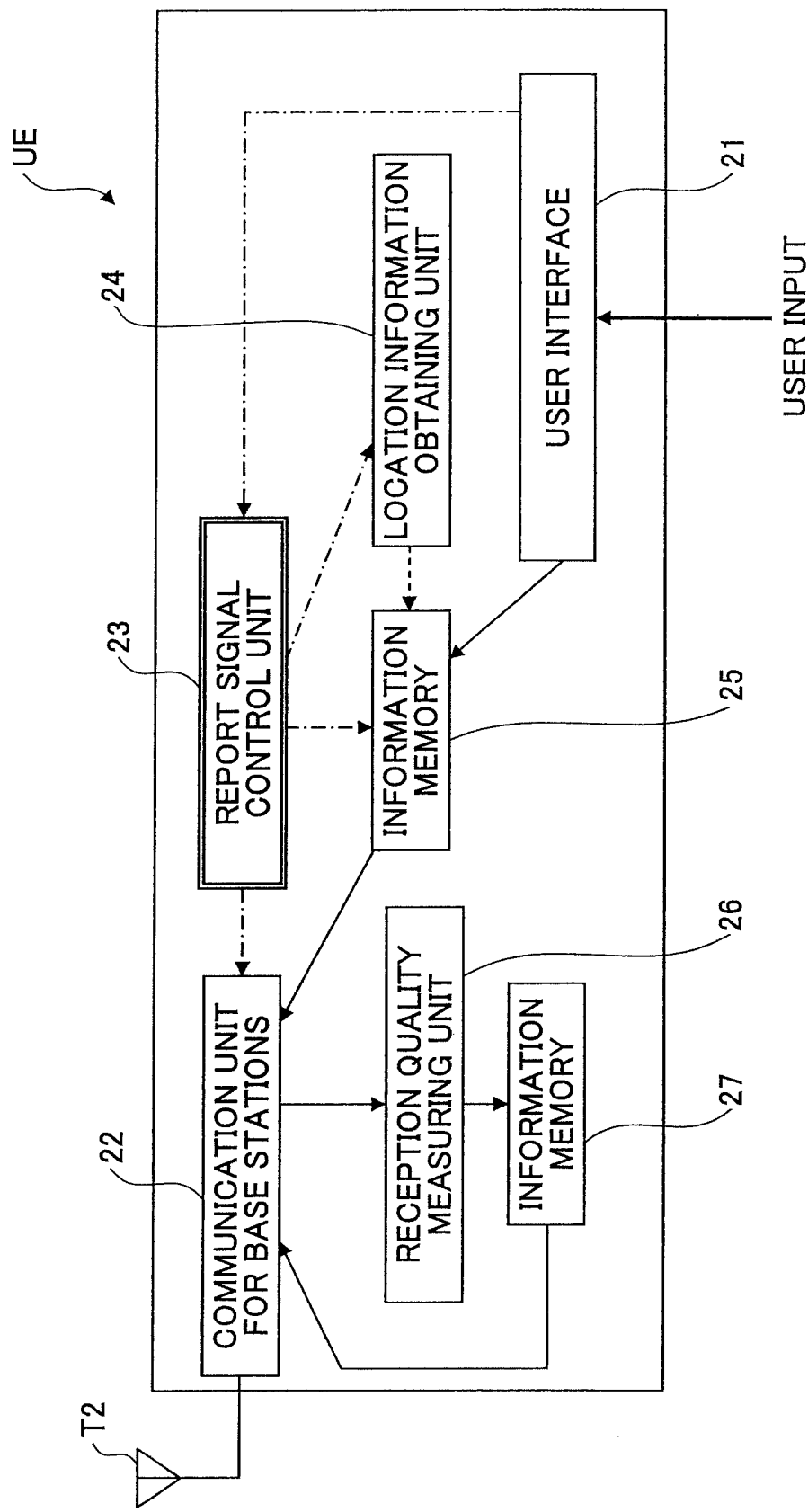
FIG. 2 is a block diagram illustrating a configuration of user equipment according to an embodiment of the present invention.

As shown in FIG. 2, the user equipment UE includes a user interface 21, an antenna T2, a communication unit 22 for communications with base stations, a report signal control unit 23, a location information obtaining unit 24, an information memory 25, a reception quality measuring unit 26, and an information memory 27.

The user interface 21 interfaces a user who desires to change communication quality and the user equipment UE. For example, the user interface 21 enables the user to specify a base station and to select whether to improve or reduce the communication quality between the user equipment UE and the specified base station. The user interface 21, for example, responds to operations of buttons or switches provided on the body of the user equipment UE or inputs from icons on the display of the user equipment UE.

The report signal control unit 23, when triggered by the user interface 21 according to a user operation or input, generates a report signal including various types of information stored in the information memory 25 and requests the communication unit 22 to transmit the report signal. As described above, the report signal includes base station specification information, location information, reception quality information, and coverage request information.

The information memory 25 stores identification information (ID information) of a base station with which the user equipment UE can communicate, the location information of the user equipment UE, and reception quality information of a signal from the base station. The base station with which the user equipment UE can communicate may be a private base station (e.g., a home eNodeB) that the user equipment UE is allowed to access. The user equipment UE may be able to communicate with two or more base stations and to select one of the base stations the user wants to use. In this case, the base station specification information includes ID information of a base station selected by the user. The location information is, for example, obtained in advance by the location information obtaining unit 24 from another system such as a GPS.

The report information may also include information (coverage request information or coverage cancellation request information) requesting either to improve or reduce the communication quality between the user equipment UE and a specified base station. This information is selected by the user via the user interface 21 and included in the report signal.

The reception quality measuring unit 26 measures reception quality of a pilot signal received by the communication unit 22 via the antenna T2 from the base station. The reception quality information indicates, for example, a reception level or a signal-to-noise ratio (S/N ratio). The above information is stored in the information memory 25. In the descriptions below, it is assumed that the reception quality information indicates a reception level and is called reception level information.

(Communication Area Shaping Method)

Figure 3:
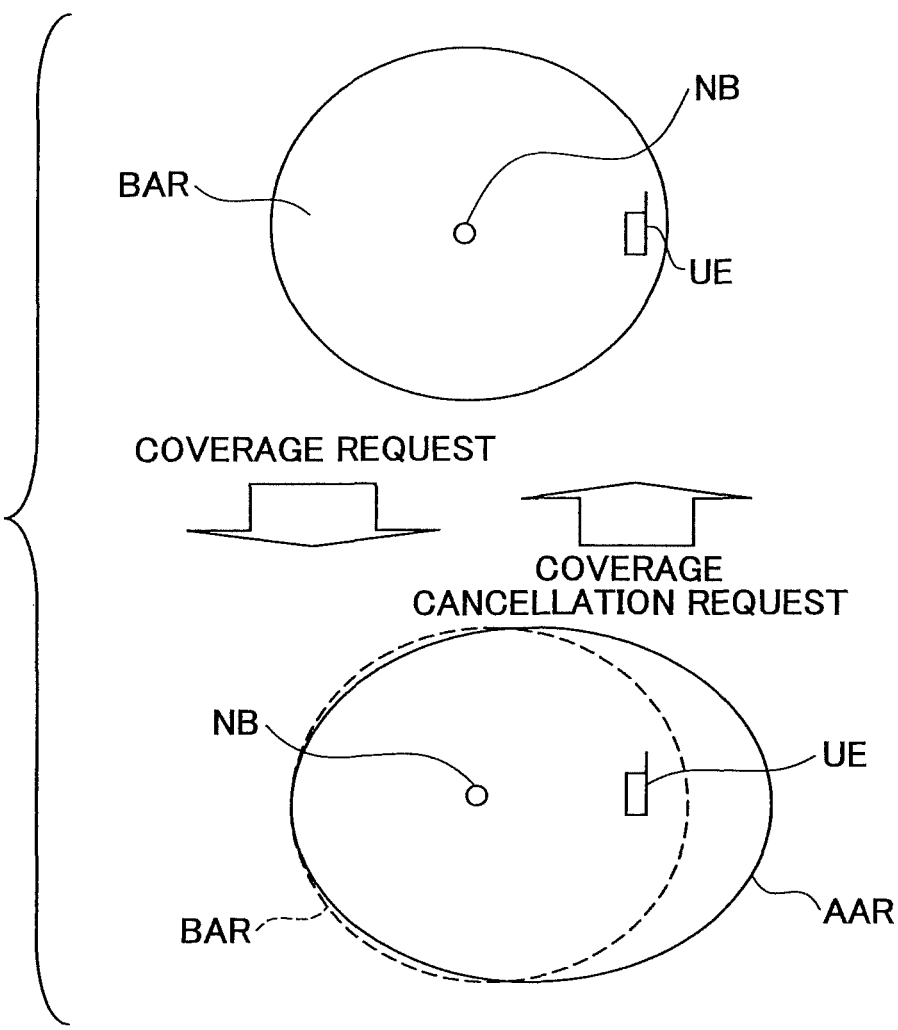
FIG. 3 is a drawing illustrating reshaping of an area by a quality improvement method according to an embodiment of the present invention.
Figure 4:
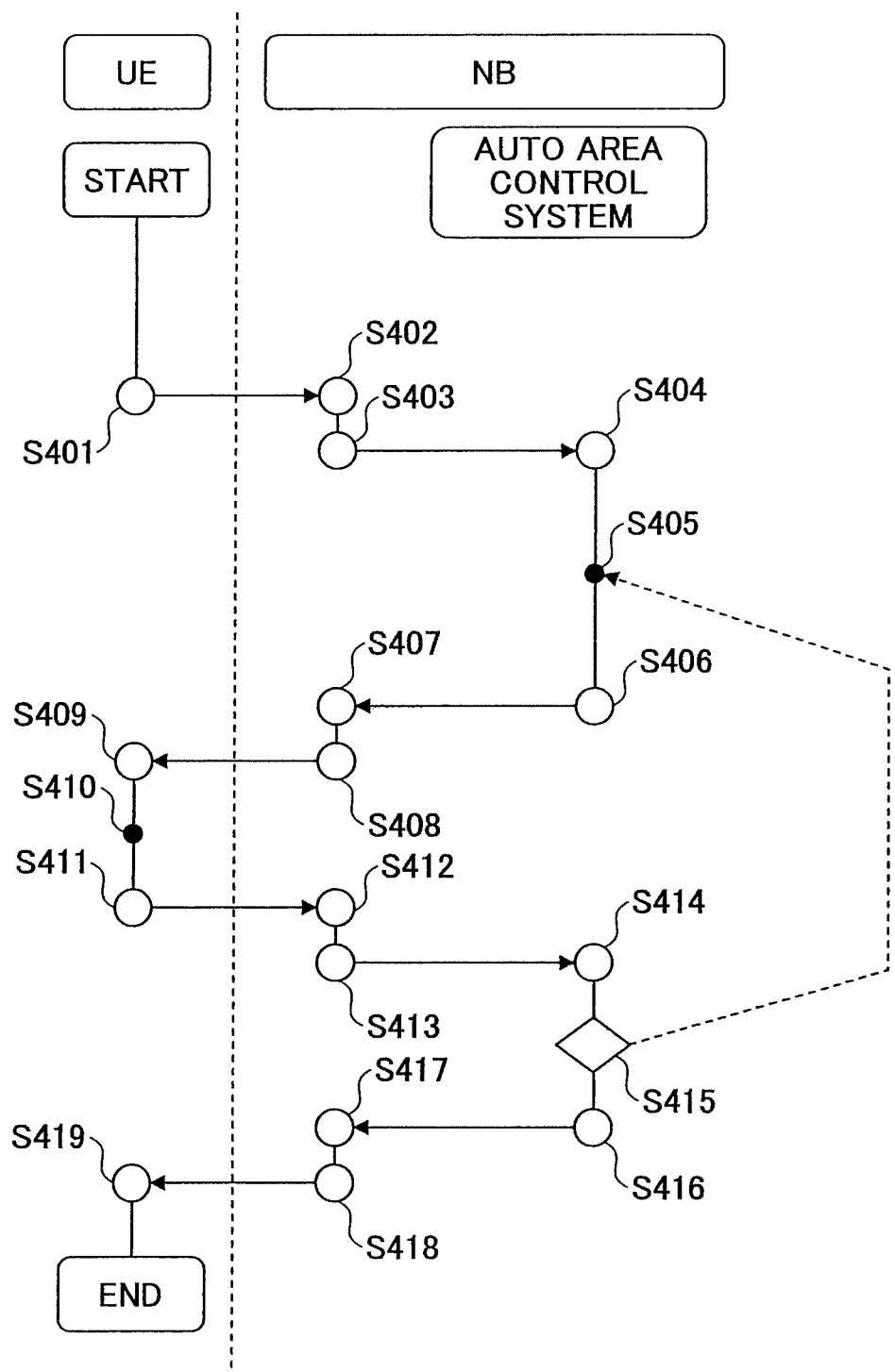
FIG. 4 is a sequence chart showing a quality improvement method according to an embodiment of the present invention.

A communication area shaping process (method) using the above described user equipment and base station is described below with reference to FIGS. 3 and 4. In this embodiment, as shown in FIG. 3, it is assumed that the user equipment UE is in an area BAR of the base station NB and is able to communicate with the base station NB. Also, it is assumed that the communication quality between the user equipment UE and the base station NB is not high enough and the user desires to improve the communication quality. Further, it is assumed that the base station NB is specified by the user.

When the user operates the user interface 21 (FIG. 2) of the user equipment UE, the user interface 21 triggers the report signal control unit 23 (FIG. 2) to transmit a report signal including various information stored in the information memory 25 via the communication unit 22 and the antenna T2 (S401). In this embodiment, the report signal includes identification information of a specified base station (base station specification information), information requesting to improve the communication quality provided by the specified base station (hereafter, may be called coverage request information), location information of the user equipment UE, and reception level information.

When the base station NB receives the report signal from the user equipment UE (S402), the report information extracting unit 13 extracts the base station specification information, the coverage request information, the location information of the user equipment UE, and the reception level information from the report signal, and temporarily stores the extracted information in the information memory 15. Also, with the extraction of the coverage request information as a trigger, the location information and the reception level information are sent from the information memory 15 to the automatic area control unit 17 (S403).

The automatic area control unit 17 receives the location information and the reception level information from the information memory 15 (S404), and determines a parameter based on the received information to improve the communication quality at the location of the user equipment UE (S405). For example, the automatic area control unit 17 determines a parameter for setting the transmission power of a pilot signal or a parameter for setting the directivity or tilt angle of the antenna T1. Alternatively, the automatic area control unit 17 may determine a parameter for setting a frequency or polarization conditions. Next, the automatic area control unit 17 sends a signal including information regarding the determined parameter to the pilot signal control unit 18 (S406). The pilot signal control unit 18 changes, for example, the transmission power or the directivity based on the parameter determined by the automatic area control unit 17. After changing, for example, the transmission power or the directivity, the pilot signal control unit 18 requests the communication unit 12 to transmit a pilot signal (S407). When requested, the communication unit 12 transmits a pilot signal including reception-level-report request information via the antenna T2 to the user equipment UE (S408). The reception-level-report request information is used to request the user equipment UE to measure the reception level of the pilot signal and to transmit the measured reception level to the base station NB.

When detecting the reception-level-report request information in the pilot signal received from the base station NB (S409), the reception quality measuring unit 26 of the user equipment UE measures the reception level and thereby generates reception level information (S410). The generated reception level information is stored in the information memory 27 and sent to the communication unit 22, and the communication unit 22 transmits a measurement information signal including the reception level information to the base station NB (S411).

When the measurement information signal is received by the communication unit 12 of the base station NB (S412), the report information extracting unit 13 extracts the reception level information (S413). The reception level information is stored in the information memory 15 and sent to the automatic area control unit 17 (S414). Then, the automatic area control unit 17 determines whether the reception level is high enough based on the reception level information (S415). More particularly, the automatic area control unit 17 compares an indicator obtained from the reception level information with a predetermined threshold. If the reception level is not high enough, the automatic area control unit 17 changes the base station parameter again (S405, as indicated by a dotted arrow line in FIG. 4), and steps S406 through S415 are repeated. If the reception level at the user equipment UE becomes high enough with or without the repetition of the steps, the automatic area control unit 17 sends a report indicating completion of reshaping the coverage area to the pilot signal control unit 18 (S416). When receiving the report, the pilot signal control unit 18 stores the current (changed) base station parameter without changing the transmission power or the directivity. The pilot signal control unit 18 transfers the report indicating completion of reshaping the coverage area to the communication unit 12 (S417). Then, the communication unit 12 transmits the report to the user equipment UE (S418, S419) and the area shaping process is completed. When a call is initiated by the user equipment UE after the area shaping process is completed, the base station NB provides service to the user equipment UE.

Referring again to FIG. 3, advantageous effects of the first embodiment of the present invention are described. As shown in FIG. 3, the coverage area of the base station NB is reshaped from the substantially-circular area BAR into an elliptical area AAR by the area shaping process described above. As a result of the reshaping, the location of the user equipment UE, which has been located at the edge of the area BAR, is changed to a point sufficiently away from the edge of the area AAR although the physical location of the user equipment UE is not changed. Normally, the communication quality at the edge of an area is poor because, for example, the transmission power is relatively low, and the communication quality at a location sufficiently away from the edge of an area is good because the transmission power is relatively high. Accordingly, the first embodiment makes it possible for a base station NB specified by a user to autonomously reconfigure base station parameters to reshape its coverage area and thereby to improve the communication quality. This in turn allows the user to specify a base station NB and to communicate with the specified base station NB with better communication quality, i.e., to receive better service from the specified base station NB.

Variation 1 of First Embodiment

In the example described above, an area is reshaped according to a request (coverage request) from the user to improve the communication quality. However, there is also a case where the user may request to cancel the coverage. For example, let us assume a case where a user requesting good communication quality in a meeting room A in a building moves to another meeting room B. In this case, it is preferable to shrink the area of the base station NB around the meeting room A and to expand the area around the meeting room B. For this purpose, the user equipment UE may be configured to transmit a report signal including coverage cancellation request information instead of coverage request information to the base station NB; and the base station NB may be configured to change a parameter(s) to shrink its area around a specified location according to the coverage cancellation request information and to compare an indicator obtained from reception level information with a predetermined threshold. In this case, if the indicator is greater than or equal to the threshold, the base station NB repeats the steps of changing the parameter again, transmitting a pilot signal with the changed parameter, receiving a report signal including reception level information, and comparing an indicator in the reception level information with the threshold until the indicator becomes less than the threshold.

The threshold may be determined when the coverage cancellation request information is received according to communication quality to be achieved at the specified location or such that communication quality before the coverage request information is transmitted from the user equipment UE is restored. Also, if the base station NB retains a previous base station parameter used before the coverage request information is transmitted from the user equipment UE, the base station NB may be configured to restore the previous base station parameter when a report signal including the coverage cancellation request information is received.

Variation 2 of First Embodiment

Here, a case where the user equipment UE cannot obtain location information from, for example, a GPS is described. In this case, the report signal does not include location information of the user equipment UE, and therefore the automatic area control unit 17 cannot determine the location at which the communication quality is to be improved. For this reason, the base station NB obtains information regarding the user equipment UE from a neighboring base station (not shown) that can communicate with the user equipment UE, and the location (direction) estimation unit 14 estimates the location of the user equipment UE based on the obtained information. The obtained information may include a reception level of a radio signal from the user equipment UE or travel time of a radio signal from the user equipment UE to the neighboring base station. The base station NB may obtain information from multiple other base stations. Information from other base stations is received via the communication unit 16.

Location information indicating the location estimated by the location (direction) estimation unit 14 is stored in the information memory 15 and the location information and the reception level information are sent from the information memory 15 to the automatic area control unit 17 (S403, S404). Then, the remaining steps described above are performed to improve the communication quality at the location of the user equipment UE.

Second Embodiment

Figure 5:
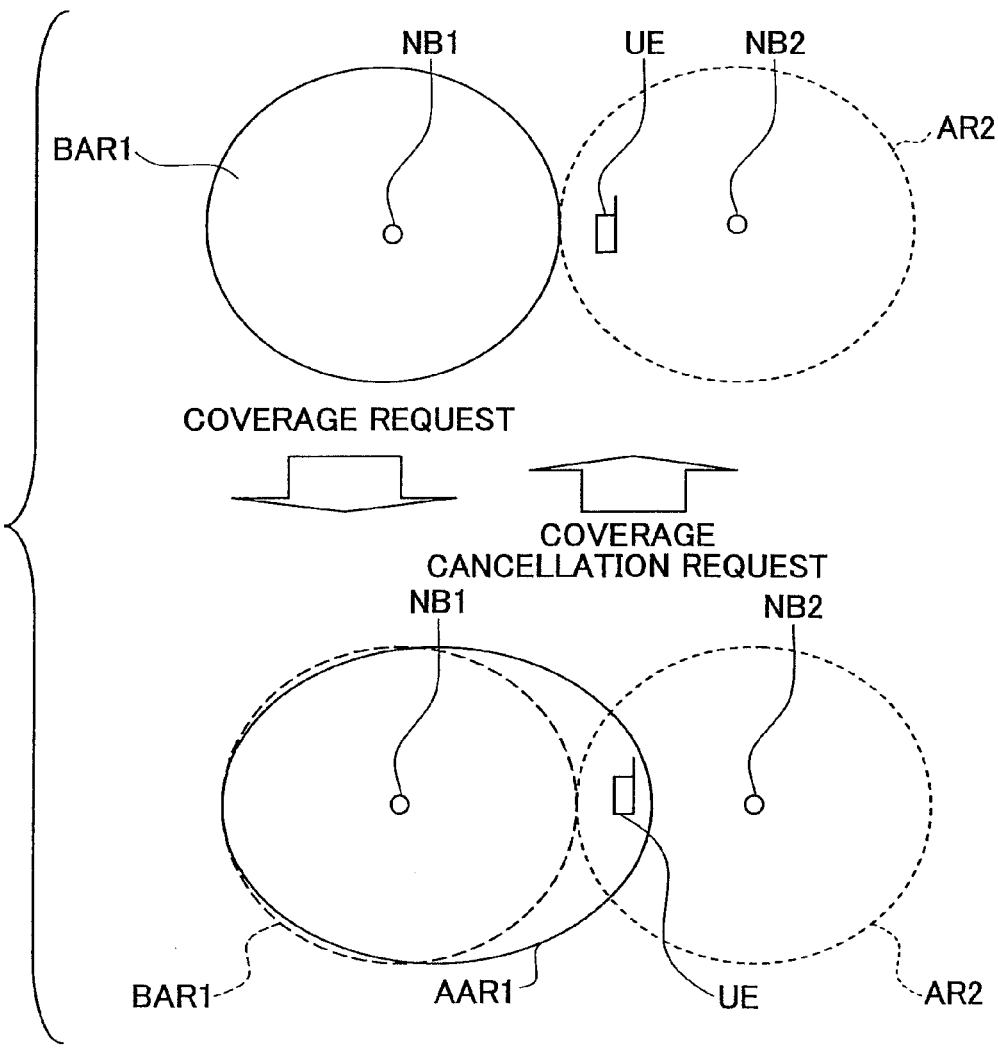
FIG. 5 is a drawing illustrating expansion of an area by a quality improvement method according to another embodiment of the present invention.

A communication area shaping process (method) according to a second embodiment of the present invention is described below with reference to FIGS. 5 and 6. In the second embodiment, as shown in FIG. 5, it is assumed that user equipment UE is located out of an area BAR1 of a base station NB1 and cannot communicate with the base station NB1; the user equipment UE is located in an area AR2 of a base station NB2 and can communicate with the base station NB2; and the user desires to use the base station NB1. The base stations NB1 and NB2 have substantially the same configuration as that of the base station NB in the first embodiment; and the user equipment UE has substantially the same configuration as that of the user equipment UE in the first embodiment. Therefore, descriptions of the base stations NB1 and NB2 and the user equipment UE are omitted here.

When the user operates the user interface 21 (FIG. 2) of the user equipment UE, the user interface 21 triggers the report signal control unit 23 (FIG. 2) to transmit a report signal including various information stored in the information memory 25 via the communication unit 22 and the antenna T2 (S601). In this embodiment, the report signal includes coverage request information, base station specification information (ID information of the base station NB1), location information of the user equipment UE, and reception level information of a pilot signal received from a base station.

Since the user equipment UE is out of the coverage area of the base station NB1 and is located in the coverage area of the base station NB2, the report signal transmitted from the user equipment UE is received by the base station NB2 instead of the base station NB1. When the report signal is received, the report information extracting unit 13 (FIG. 1) of the base station NB2 extracts the coverage request information, the base station specification information, the location information, and the reception level information from the report signal. The base station NB2 compares its own ID information with the extracted base station specification information and determines that the base station NB2 is not specified by the user. Then, the base station NB2 transfers the report signal received from the user equipment UE via the communication unit 16 to a base station controller (upper node) constituting a part of a network NW (S602). Alternatively, the base station NB2 may transfer the report signal directly to the base station NB1 without using the base station controller. Therefore, in the descriptions below, the term "network NW" is used instead of the base station controller.

When receiving the report signal from the base station NB2 (S603), the network NW extracts the base station specification information from the report signal and transfers the report signal to the base station NB1 specified by the base station specification information (S604). At this stage, a communication path from the network NW via the base station NB2 to the user equipment UE (and a communication path in the opposite direction) is established.

When the report signal is received from the network NW (S605), the report information extracting unit 13 (FIG. 1) of the base station NB1 extracts the coverage request information, the base station specification information, the location information, and the reception level information from the report signal. The extracted information is temporarily stored in the information memory 15 and with the extraction of the coverage request information as a trigger, the location information and the reception level information are sent from the information memory 15 to the automatic area control unit 17.

The automatic area control unit 17 receives the location information and the reception level information, and determines a parameter based on the received information to improve the communication quality at the location of the user equipment UE (S606). Next, the automatic area control unit 17 sends a signal including information regarding the determined parameter to the pilot signal control unit 18 (S607). For example, the automatic area control unit 17 determines a parameter for setting the transmission power of a pilot signal or a parameter for setting the directivity or tilt angle of the antenna T1. Alternatively, the automatic area control unit 17 may determine a parameter for setting a frequency or polarization conditions. When receiving the information regarding the determined parameter (S608), the pilot signal control unit 18 changes, for example, the transmission power or the directivity based on the determined parameter. After changing, for example, the transmission power or the directivity, the pilot signal control unit 18 requests the communication unit 12 to transmit a pilot signal. When requested, the communication unit 12 transmits the pilot signal via the antenna T2.

Also, the base station NB1 transmits a reception-level-report request signal via the communication unit 16 to the network NW (S609). The reception-level-report request signal is used to request the user equipment UE to measure the reception level of the pilot signal and transmit the measured reception level. When receiving the reception-level-report request signal from the base station NB1 (S610), the network NW transmits the reception-level-report request signal via the communication path described above to the user equipment UE (S611).

When receiving the reception-level-report request signal (S612), the user equipment UE receives (or tries to receive) the pilot signal from the base station NB1, and the reception quality measuring unit 26 of the user equipment UE measures the reception level and thereby generates reception level information (S613). The generated reception level information is stored temporarily in the information memory 27 and sent to the communication unit 22, and the communication unit 22 transmits a measurement information signal including the reception level information via the above described communication path to the network NW (S614).

The network NW receives the measurement information signal (S615) and transfers the measurement information signal to the base station NB1 (S616).

When the measurement information signal is received by the communication unit 16 (FIG. 1) of the base station NB1 (S617), the report information extracting unit 13 extracts the reception level information (S618). Then, the reception level information is stored in the information memory 15 and is sent to the automatic area control unit 17 (S619). The automatic area control unit 17 determines whether the reception level is high enough based on the reception level information reported by the user equipment UE (S620). More particularly, the automatic area control unit 17 compares an indicator obtained from the reception level information with a predetermined threshold. If the reception level is not high enough, the automatic area control unit 17 changes the base station parameter again (S606, as indicated by a dotted arrow line in FIG. 6), and steps S607 through S620 are repeated. If the reception level becomes high enough with or without the repetition of the steps (S621), the automatic area control unit 17 sends a report indicating completion of reshaping the coverage area to the communication unit 16 (S622). Then, the communication unit 16 transmits the report indicating completion of reshaping the coverage area to the network NW (S623). The network NW transmits the report via the above described communication path to the user equipment UE (S624, S625), and the area shaping process is completed (S626). When a call is initiated by the user equipment UE after the communication area shaping process is completed, the base station NB1 provides communication service to the user equipment UE. In step S624, if the reception level is high enough, the base station NB1 may instead transmit the report indicating completion of reshaping the coverage area directly to the user equipment UE.

Variation 1 of Second Embodiment

In the second embodiment, it is assumed that the user equipment UE can communicate with the base station NB2. Below, a case where the user equipment UE is out of coverage areas of all base stations is described. Such a case may occur due to weather conditions or malfunctions of base stations or when the user equipment UE is in a mountainous area or an isolated island. In such a case, the user equipment UE transmitting a report signal recognizes that it cannot access any base station, stores the report signal in the information memory 25, and retransmits the report signal when the coverage area of a specified base station or any other base station is restored or when the user equipment UE enters the coverage area of a specified base station or any other base station. This configuration enables the user equipment UE to communicate with the specified base station immediately after the coverage area is restored or the user equipment UE enters the coverage area. In a case where the user equipment UE moves and enters a coverage area, it is preferable to update the location information in the report signal.

Although the present invention is described above based on various embodiments, the present invention is not limited to the above embodiments and variations and modifications may be made without departing from the scope of the present invention. For example, although the automatic area control unit 17 of the base station NB in the above embodiments has a function to determine whether the base station NB is specified, this function may be provided in the report information extracting unit 13. In other words, a function to extract information from a signal such as a report signal and a function to determine whether the base station NB is specified may be implemented by the same component. Also, the function to determine whether the base station NB is specified may be implemented by a separate component. Similarly, the function to determine the reception quality based on the measurement information from the user equipment UE may be provided in the report information extracting unit 13 instead of the automatic area control unit 17. Also, this function may be implemented by a separate component.

In the area shaping method in the first and second embodiments, the base station parameter changed according to a request from the user equipment UE may be restored to its previous value if no call is initiated by the user equipment UE for a predetermined period of time after the base station parameter is changed. For example, the automatic area control unit 17 may be configured to start counting time after sending the report indicating completion of reshaping the coverage area to the pilot signal control unit 18 (S416) and to report the previous base station parameter to the pilot signal control unit 18 if no call is received from the user equipment UE for a predetermined period of time. In this case, the pilot signal control unit 18 changes the base station parameter to its previous value based on the reported previous base station parameter. This configuration makes it possible to improve the radio resource use efficiency.

In the area shaping process described in the second embodiment, if the communications between the base station NB1 and the user equipment UE are enabled after changing the base station parameter of the base station NB1, the remaining steps may be performed between the base station NB1 and the user equipment UE. In other words, if the area of the base station NB1 is reshaped to cover the user equipment UE (see FIG. 3) as a result of changing a base station parameter, the remaining area shaping process may be performed as described in the first embodiment. Also, the base station NB1 may be configured to transmit the reception-level-report request signal together with a pilot signal or to include the reception-level-report request signal in a pilot signal. This configuration makes it possible to perform the area shaping process between the base station NB1 and the user equipment UE after communications between them are enabled.

Also, when report signals including coverage request information are transmitted from multiple user terminals (user equipment (UE)) at the same time or at short intervals, the base station NB may be configured to store location information and reception level information extracted from the report signals by the report information extracting unit 13 in the information memory 15, to conduct statistical processing on the stored information, and to reshape its coverage area based on the processed information. For example, the base station NB may be configured to determine a range where the multiple user terminals are located based on their location information and to change a base station parameter such that its coverage area encompasses the determined range. This configuration eliminates the need for the base station NB to reshape the coverage area for each user terminal. This in turn makes it possible to reduce the workload of the base station NB and to improve the radio resource use efficiency. Also, the base station NB may be configured to determine priorities of locations to be included in the coverage area based on the reception level information from multiple user terminals such that a location with a lower reception level is preferentially included in the coverage area.

Also in the area shaping method of the second embodiment, the location of the user equipment UE may be estimated if the user equipment UE is unable to obtain the location information from, for example, a GPS, and the communication quality between the user equipment UE and a specified base station may be improved based on the estimated location.

Further, a communication system may include the user equipment UE and the base station NB or NB1 that is a home eNodeB. In this case, the ID of the base station NB or NB1 that is a home eNodeB may be stored in advance in the information memory 15 of the user equipment UE.

The present international application claims priority from Japanese Patent Application No. 2007-120259 filed on Apr. 27, 2007, the entire contents of which are hereby incorporated herein by reference.

The invention claimed is:

1. A mobile station, comprising:
   a signal generating unit configured to generate a first signal including base station specification information specifying a base station, reception quality information indicating reception quality of a signal received from the specified base station, and change request information requesting to change communication quality between the mobile station and the specified base station;
   an interface configured to cause the signal generating unit to output the first signal in response to a user operation; and
   a communication unit configured to transmit the first signal output from the signal generating unit,
   wherein by transmitting the first signal, the mobile station requests the specified base station to obtain location information indicating a location of the mobile station and to change at least one base station parameter based on the reception quality information and the location information in order to change the reception quality at the location of the mobile station.

2. The mobile station as claimed in claim 1, further comprising:
   a location information obtaining unit configured to obtain location information indicating a location of the mobile station.

3. The mobile station as claimed in claim 1, further comprising:
   a reception quality measuring unit configured to generate the reception quality information by receiving a pilot signal transmitted from the base station specified by the base station specification information and measuring reception quality of the pilot signal.

* * * * *